No. 8,580. J. HYDE. CHUCK FOR LATHES. PATENTED DEC. 9, 1851.
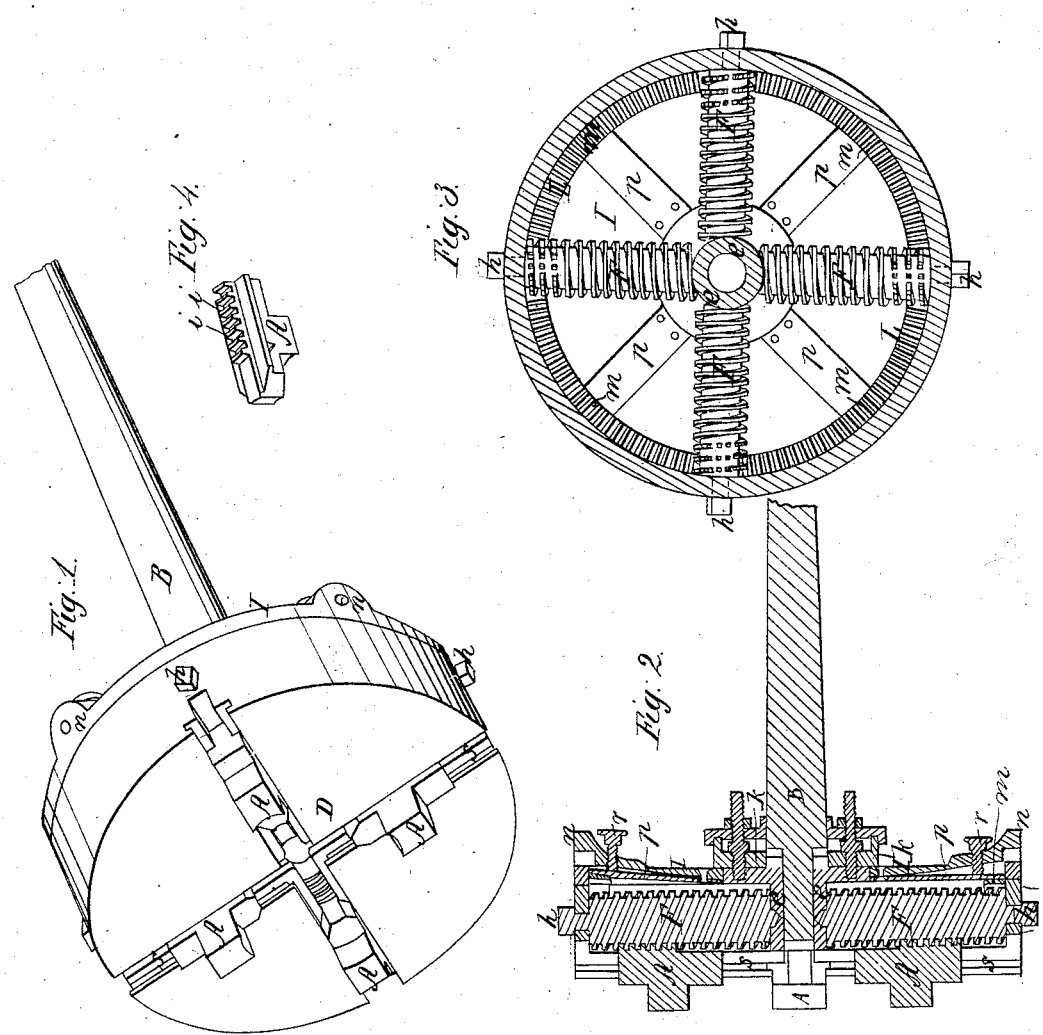

UNITED STATES PATENT OFFICE.

JOSEPH HYDE, OF TROY, NEW YORK, ASSIGNOR TO THOS. J. EDDY.

CHUCK FOR LATHES.

Specification of Letters Patent No. 8,580, dated December 9, 1851.

*To all whom it may concern:*

Be it known that I, JOSEPH HYDE, of Troy, in the county of Rensselaer and State of New York, have invented certain new and useful Improvements in Chucks for Turning Lathes; and I do hereby declare that the following is a full, clear, and exact description of my said invention, reference being had to the accompanying drawing, which forms part of this specification, and in which—

Figure 1 is a view in perspective of my universal chuck. Fig. 2 is a longitudinal section of the same perpendicular to its face. Fig. 3 is a plan of the same with the face removed and Fig. 4 is a view in perspective of one of the carriers.

My universal chuck consists essentially of a series of gripping jaws which are movable toward and from the axis of the lathe mandrel and in directions at right angles thereto, which jaws can at pleasure be made to grip an article simultaneously and at equal distances from the axis of the lathe mandrel or can be made to act separately and independently of each other which also can be made to grip the article simultaneously at points situated at different distances from the axis of the lathe mandrel being thus both a concentric and eccentric chuck.

In the chuck represented in the accompanying drawing there are four jaws (A) which are constructed to slide in radial lines from and toward the center of the chuck or the axis of the lathe mandrel (B) in radial grooves (s) which are formed in a circular plate (D). This plate forms the head of a cylindrical case which is strengthened by radial ribs on its inner side, that extend from the hub to the rim; within this case the mechanism for actuating the gripping jaws is situated. The central part of this case is filled by a hub (e) which is firmly secured to the plate and fitted to the projecting extremity of the lathe mandrel. Within the case are four screws (F) which are situated immediately behind the grooves in which the gripping jaws slide; these screws are pivoted at their outer extremities to the cylindrical sides of the case. The outer extremities of each of these screws extends beyond the side of the case and is formed into a head (h) to which a wrench can be applied for the purpose of turning the screw. The inner sides of the jaws have teeth (i) formed upon them, as shown at figure (4), which fit into the threads of the corresponding screws so that when the latter are turned in one direction or the other the jaws are forced to slide in their grooves toward or from the center of the chuck. The hinder side of the cylindrical case is closed by a circular plate (I) which is secured to the hub (e) by a collar (k) which permits it to turn freely upon the hub as an axis. The screws which connect the collar (k) to the hub (e) have screw shanks extending back from their heads by means of which the chuck is secured to the face plate of the lathe. The inner face of this back plate has an annular series of cog teeth L secured to it and the corresponding portions of the threads of the several screws are notched transversely to form cog teeth with which those of the back plate engage, so that when the latter is turned the four screws are forced to turn simultaneously upon their pivots to move their corresponding jaws simultaneously toward or from the center of the chuck, and when one screw is turned by applying a wrench to its square head, it by acting upon the cog teeth of the back plate imparts a corresponding movement to the other screws in the series. In order to facilitate the turning of the back plate it is fitted with ears (n) in which sockets are made to receive the extremity of a bar to which the hand of the workman is applied.

The mechanism thus far described is well adapted to the chucking of symmetrical bodies as the jaws are caused to move simultaneously and equally from and toward the center of the chuck. In order that the several jaws may be moved independently portions (m) of the teeth of the back plate corresponding in number with that of the screws, and in relative positions with those of the screws, are made fast to spring plates (p p) which are situated in radial sockets formed in the back plate. The tendency of the spring plates is to draw the teeth secured to them out of the range of those upon the screws, they are retained in range by means of clamp screws (r r) which are fitted to the back plate and whose inner extremities bear against the hinder faces of the spring plates. Hence if the back plate is turned to such a position that the teeth upon the spring plates are in gear with those of the carrier screws, the attendant by slacking any one clamp screw can permit the spring plate upon which it bears to spring back into its appropriate socket and thus to draw the teeth secured to it out of those upon the jaw screw. By this movement that particular jaw screw is left free and can be turned by the application of a wrench to its head, without influencing the others. The workman may in succession release each jaw screw by slacking the respective clamp screws, he may then move the screws separately to set the jaws at unequal distances from the center of the chuck to enable them to grip some article of irregular form. And when once set to the required position they may all be again connected by screwing up the clamp screws, after which the turning of any one screw or of the back plate will cause the whole set of jaws to approach or recede simultaneously from the center of the chuck without affecting the differences in their respective distances therefrom; hence if the jaws be set to chuck one article of irregular form they may be made to move simultaneously to chuck in succession any number of articles of the same from without requiring the independent movement of the several screws; thus by these two modes of adjustment this is constituted at once a concentric and an eccentric chuck.

Some constructors may prefer to connect the head of each carrier screw with the rim of the case by a collar which screws into the rim, the central opening of the collar forming a box or bearing for the outer journal of the screw.

Having thus described my improved chuck what I claim therein as new and desire to secure by Letters Patent is—

1. The mechanism herein described or the equivalent thereof for connecting and disconnecting at will the whole or any part of the screws which operate the gripping jaws, with the wheel which turns them so that the screws and jaws may be moved either separately or in connection or in part separate and in part connected, whereby objects of either regular or irregular shape may be chucked either eccentrically or concentrically with the axis of the mandrel substantially as herein described.

2. I also claim the turning plate (I) of the chuck constructed with a cog wheel on its inner face made in segments part of which can be withdrawn out of gear with the pinions on the carrier screws or held in gear therewith by means of set screws and springs or the equivalent thereof substantially as herein set forth.

In testimony whereof I have hereunto subscribed my name dated this 30th of June 1851.

JOSEPH HYDE.

Witnesses:
 E. BELL,
 F. CRUIKSHANK.